US012789212B2

(12) United States Patent
Golembiewski

(10) Patent No.: US 12,789,212 B2
(45) Date of Patent: Nov. 10, 2026

(54) SYSTEM AND PROCESS FOR APPLICATION OF A VEHICLE BED-LINE

(71) Applicant: Ground Effects, LLC, Sterling Heights, MI (US)

(72) Inventor: Peter John Golembiewski, Belleville, MI (US)

(73) Assignee: Ground Effects, LLC, Sterling Heights, MI (US)

( * ) Notice: Subject to any disclaimer, the term of this patent is extended or adjusted under 35 U.S.C. 154(b) by 0 days.

(21) Appl. No.: 18/778,070

(22) Filed: Jul. 19, 2024

(65) Prior Publication Data

US 2025/0025904 A1 Jan. 23, 2025

Related U.S. Application Data

(60) Provisional application No. 63/514,634, filed on Jul. 20, 2023.

(51) Int. Cl.
*B05B 12/20* (2018.01)
*B60R 13/01* (2006.01)

(52) U.S. Cl.
CPC .............. *B05B 12/20* (2018.02); *B60R 13/01* (2013.01)

(58) Field of Classification Search
CPC ................................ B05B 12/20; B60R 13/01
See application file for complete search history.

(56) References Cited

U.S. PATENT DOCUMENTS

| | | | |
|---|---|---|---|
| 4,300,198 | A | 11/1981 | Davini |
| 4,374,869 | A | 2/1983 | Dorey, II et al. |
| 4,764,667 | A | 8/1988 | Abe et al. |
| 4,974,895 | A | 12/1990 | Davenport |
| 5,689,415 | A | 11/1997 | Calotychos et al. |
| 5,814,398 | A | 9/1998 | Kronz et al. |
| 6,413,588 | B1 | 7/2002 | Pettus et al. |
| 6,425,507 | B1 | 7/2002 | Allen |
| 6,462,160 | B1 | 10/2002 | Ogawa et al. |
| 6,826,497 | B1 | 11/2004 | Collins |
| 7,387,819 | B2 | 6/2008 | Emch et al. |
| 7,504,133 | B2 | 3/2009 | Cuyler et al. |
| 7,611,772 | B2 | 11/2009 | Barancyk et al. |
| 8,168,299 | B1 | 5/2012 | Locke, II et al. |
| 8,746,164 | B2 | 6/2014 | Molz et al. |
| 11,260,422 | B2 | 3/2022 | Dollar et al. |
| 2002/0198618 | A1 | 12/2002 | Madden et al. |
| 2003/0155067 | A1 | 8/2003 | Syron |

(Continued)

OTHER PUBLICATIONS

Laser Knowledge, DP LASER, What is the Benefits of Laser Cleaning in Automotive Industry, https://dplaser.com/the-benefits-of-laser-cleaning-in-automotive-industry/, Jun. 9, 2023.*

(Continued)

*Primary Examiner* — James M Mellott
(74) *Attorney, Agent, or Firm* — Benesch Friedlander Coplan & Aronoff LLP

(57) ABSTRACT

A system of reusable masking aids usable in a method of spraying a bed-liner on a portion of a vehicle is provided. A method of applying a spray-on bed-liner to a vehicle is also provided. The method makes use of the system of reusable masking aids to make the process of spraying on a bed-liner more efficient, generate less waste, and more apt to subject any part of the method to automation.

21 Claims, 6 Drawing Sheets

(56) References Cited

U.S. PATENT DOCUMENTS

| | | | | |
|---|---|---|---|---|
| 2003/0224198 | A1* | 12/2003 | Cuyler | B05B 12/26 428/577 |
| 2005/0061239 | A1 | 3/2005 | Kyontani | |
| 2005/0103889 | A1 | 5/2005 | Langeman | |
| 2007/0048445 | A1 | 3/2007 | DiMario | |
| 2007/0200383 | A1 | 8/2007 | Cuyler et al. | |
| 2009/0104393 | A1 | 4/2009 | Asano et al. | |
| 2010/0026743 | A1 | 2/2010 | Van Thillo et al. | |
| 2010/0101492 | A1 | 4/2010 | Sarajain et al. | |
| 2012/0313392 | A1 | 12/2012 | Bingle | |
| 2015/0147460 | A1 | 5/2015 | Manzi et al. | |
| 2017/0136697 | A1 | 5/2017 | Kia et al. | |
| 2017/0203580 | A1 | 7/2017 | Martins Pinto | |
| 2017/0259288 | A1 | 9/2017 | Scott | |
| 2017/0341105 | A1 | 11/2017 | Arace et al. | |
| 2017/0361355 | A1 | 12/2017 | Dollar et al. | |

OTHER PUBLICATIONS

International Search Report and Written Opinion issued in International Patent Application No. PCT/US2024/038721, mailing date Sep. 27, 2024.

classiczcars.com; https://www.classiczcars.com/forums/topic/30824-installing-emblems-drilling-through-paint/; Feb. 14, 2009.

Hunt Midwest, Automotive Alley—Ground Effects SubTropolis Fly-Through, found at https://huntmidwest.com/industrial-space-for-lease/subtropolis-tenant-case-studies/case-study-ground-effects/ and https://www.you tube.com/watch?v= CgK-nwjcLug, Sep. 30, 2014.

Bob Shipp, Ship-To vs. Ship-Thru Ordering: What's Better?, Worktruck, https://www.worktruckonline.com/146092/ship-to-vs-ship-thru-ordering-whats-better-for-your-fleet, Nov. 1, 2008.

Weber, Outsourcing the line, https://www.assemblymag.com/articles/84382-outsourcing-the-line, Jun. 1, 2006.

GFX—Polyurea Spray Coating, Ground Effects, web.archive.org/web/20150309075357/htt://www.gfxltd.com:80/products-services/ sub-page?pg=polyurea-spray-coating; Mar. 9, 2015.

Follett, Non-core activities can be simplified and improved with outsourcing, https://www.plantservices.com/articles/2003/13/?show= all, Feb. 18, 2003.

Inside Indiana Business, https://neindiana.com/news/ground-effects-llc-planning-jobs-for-fort-wayne, Jul. 3, 2013.

GFX—Mass Vehicle Customization—Ford, https://web.archive.org/web/20150309075340/http://www.gfxltd.com/products-services/ sub-page?pg=ford, Mar. 9, 2015.

GM supplier builds new production facility, https://www.greaterfortwayneinc.com/gm-supplier-builds-new-production-facility/, Aug. 26, 2013.

Chevy Silverado and GMC Sierra Forum—factory spray on bed liner, https://www.silveradosierra.com/threads/ factory-spray-on-bed-liner.213802/, Mar. 2014-Apr. 2014.

Dodge Ram Forum—Ram spray in bed liner or aftermarket?, https://www.ramforumz.com/threads/ ram-spray-in-bed-liner-or-aftermarket.183837/, Sep. 2014.

Chevy Colorado & GMC Canyon—Factory?? Spray-in bed liner, https://www.ramforumz.com/threads/ ram-spray-in-bed-liner-or-aftermarket.183837 /, Nov. 2014.

GFX Ford Bed Liner, Ben Dollar, https://www.youtube.com/watch?v=_4QKU0C-GG8.

Automotive Alley—Ground Effects SubTropolis Fly-Through, https://www.youtube.com/watch?v=CgK-nwjcLug.

Line-X Spray-on Truck Bed Liners, https://www.youtube.com/watch?v=797vHu47XCU&t=14s, 2013.

Blackout Hood Logo Mod, found at https://www.youtube.com/watch?v=XStl09zA1EU, Sep. 9, 2013.

* cited by examiner

3B

3C

3A

SYSTEM AND PROCESS FOR APPLICATION OF A VEHICLE BED-LINE

RELATED APPLICATION

This application claims benefit to. U.S. Provisional Patent Application 63/514,634, filed Jul. 20, 2024, which is hereby incorporated by referent in its entirety.

BACKGROUND

A bed-liner has the advantage of protecting a truck bed, for example, from dents, scratches and pain chipping. Bed-liners can be easy to clean and keep cargo from moving around when a vehicle is in use. Spray-on bed-liners create a custom coat on the truck bed to protect bed against scratches and seals the truck bed floor, sidewalls and tailgate.

Most spray-on bed-liners processes begin with a step of masking off portions of a vehicle where spray-on bed-liner is not desired. This process involves manually applying to a vehicle tape, wired tape, and plastic to cover entire portions vehicle where bed-liner spray is not desired. The masking may include canvas wheel and cab covers (FIG. 1). The process of masking the vehicle prior to application of a spray-on bed-liner is time consuming, requires manual labor, and generates a lot of waste.

Therefore a need exists to lend the process of spray-on bed-liners to automation and obviating the need for the time-consuming step of masking the vehicle prior to application of the bed-liner.

SUMMARY

The present disclosure provides a system of reusable masking aids usable in a method for spraying on a bed-liner to a portion of a vehicle. The system and process significantly reduce costs and time required to apply a spray-on bed-liner to a vehicle. A method of applying a spray-on bed-liner to a vehicle is also provided. The method makes use of the system of reusable masking aids to make the process of spraying on a bed-liner more efficient, generate less waste, and more apt to subject any part of the method to automation.

DETAILED DESCRIPTION

Figures 1A, 1B:
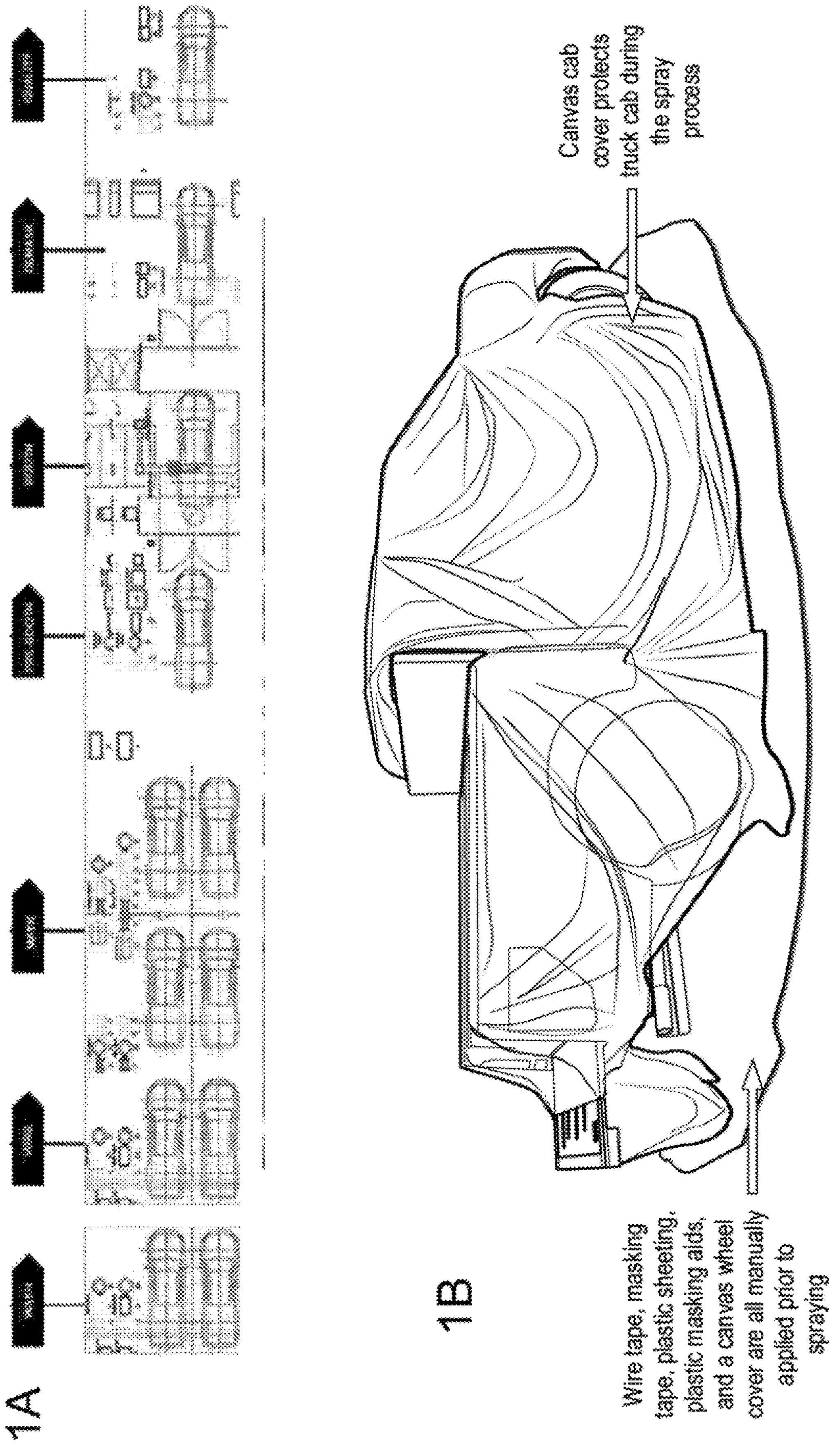
FIG 1A-1B (PRIOR ART)
FIG. 1A-1B demonstrates a prior art process of applying a bed-liner to a pickup truck.

A method for application of a spray-on bed-liner to a portion of a vehicle, the method including steps of: providing a system of reusable masking aids; securing the system of vehicle masking aids to a vehicle; applying a spray-on bed-liner to the vehicle; and removing the masking aids. By following the steps of this method, then, a spray-on bed-liner is applied to the portion of the vehicle. Securing the system of vehicle masking aids to the vehicle encompasses any methods of adding, situating or placing the system components on the vehicle so that they will remain in place during the application of the spray-on bed-liner and will be able to be removed after the spray-on process is complete without marring the bed-liner.

In some aspects, the method for application of a spray-on bed-liner may include a step of performing a quality control inspection of the vehicle once masking aids are removed from the vehicle.

In some aspects, the method for application of a spray-on bed-liner may include, prior to attaching the system of vehicle masking aids to a vehicle, cleaning, drying, or etching the portion of the vehicle to which the bed-liner is applied.

In some aspects, the system of reusable masking aids may include any combination of at least one fender side protector; at least one sidewall masking aid; at least one coated tailgate bridge, at least one tailgate masking aid; at least one a coated D-Pillar; and at least one cab structure. It is of course contemplated that the system may encompass at least one fender side protector; at least one sidewall masking aid; at least one coated tailgate bridge, at least one tailgate masking aid; at least one a coated D-Pillar. The system may encompass at least one fender side protector; at least one sidewall masking aid; and at least one a coated D-Pillar. The system may encompass two fender side protectors; at least one sidewall masking aid; at least one coated tailgate bridge, at least one tailgate masking aid; at least two a coated D-Pillar; and a cab structure.

In some aspects, the method or process for applying a spray-on bed-liner to a portion of a vehicle is partially or fully automated. It is appreciated that the system and methods according to many aspects of the invention are usable with any combination of manual and automated methods and further are useful only in part. That is, in one aspect, the one fender side protector; at least one sidewall masking aid; at least one coated tailgate bridge, at least one tailgate masking aid; at least one a coated D-Pillar of the masking system are usable with a canvas or plastic cab cover in place of the cab structure. Likewise, a system using the fender side protector; at least one sidewall masking aid; at least one coated tailgate bridge, at least one tailgate masking aid; at least one a coated D-Pillar and a cab structure may also include canvas or plastic wheel covers. Further, the system maybe used without the coated tailgate bridge, at least one tailgate masking aid if the tailgate is missing from the vehicle. Elements may be added to the system as needed for any vehicle configuration. In some aspects, the method or process for applying a spray-on bed-liner can apply to a vehicle part or element. Elements may be added to the system as needed for any vehicle configuration, including any condition where the truck bed is not physically attached to the rest of the truck/chassis/vehicle and is sprayed separately.

In some aspects, the method for application of a spray-on bed-liner to a portion of a vehicle includes use of a system of masking aids that is specific for a vehicle make or model of the vehicle. Any commercial available vehicle would be suitable for the development of a vehicle specific system of masking aids.

In some aspects, the method for application of a spray-on bed-liner to a portion of a vehicle includes application of a bed-liner to the truck bed of a pick-up truck. It is appreciated that one very useful example of an application of a spray-on bedliner is to the bed of a pickup truck. However, the systems and methods described herein are useful in any application of a spray-on after market treatment to any vehicle or trailer or the like. For example, the bottom surface of a trailer, cargo vehicle, or any other surface on any kind of vehicle intended for personal or commercial use that can reasonably expect wear is protectable by a spray-on bed-liner of the instant invention.

The systems and methods of the invention are compatible with any spray-on bedliner, including for example the poly-urea spray coating of Ground Effects, LLC.

In some aspects, the invention provides a system of reusable masking aids comprising any combination of: fender side protectors; sidewall masking aids; a coated tailgate bridge; tailgate masking aids; a coated D-Pillar or cab structure. With respect to the cab structure, the structure may comprise two doors. One suitable for an operator to enter and exit the structure and one for a vehicle cab to enter and/or exit the structure. In some aspects the cab container will have three exits, one for an operator to enter and exit the structure and one for a vehicle to enter the structure, with a door that meets the other aspects of the system and seals the vehicle cab from the area of the vehicle to which the spray-on bed-line is being supplied and a separate vehicle exit on the opposite side of the structure from the vehicle entrance so that the vehicle may move in a one-way direction through the cab container structure.

It is appreciated that not all types of masking aids are necessary for all vehicles or configurations of portion of the vehicle to be treated by the spray-on bedliner.

In some aspects, the system of reusable masking aids that is any combination of fender side protectors; sidewall masking aids; a tailgate bridge; tailgate masking aids; a D-Pillar are themselves coated with a material. This coating of the masking aids may be a coating of the bed-liner material itself, may be a distinct coating that resists application of the bed-liner to the reusable masking aids. In some aspects all of the masking aids of the system are coated or uncoated or a combination of coated and uncoated masking aids may form the system.

In some aspects, the invention provides a system of masking aids is specific for a vehicle make or model and in some aspects, the vehicle is a pickup truck. It is appreciated that the system of masking aids may be custom made for any make or model of vehicle and further may be custom selected in consideration of after-market modification that may have been made to the vehicle.

In some aspects, the portion of the vehicle to which the bedliner is to be applied is pretreated. This pretreatment may include a step of washing and drying either the entire vehicle or only the portion of the vehicle to which the bedliner is applied. The drying may include mechanical dryers or may be performed by a user with a drying towel. After a drying step, the pretreatment may further include laser etching the part, portion, section, area, truck bed, or segment of the vehicle to which the bed-liner is to be applied. The purpose of the etching is to enhance the durability and adhesion of the bed-liner. Thus, any type of laser etching is fully encompassed as an aspect of the invention. Any type of laser may perform this step and any amount of laser etching is encompassed as an aspect of the invention. Pretreatment may also include a step of installing a logo or any other preparatory step necessary prior to adding the masking aids to the vehicle.

EXAMPLES

Example 1: Development of Reusable Masking Aids for a Pick-Up Truck

Figures 2A, 2B, 2C, 2D:
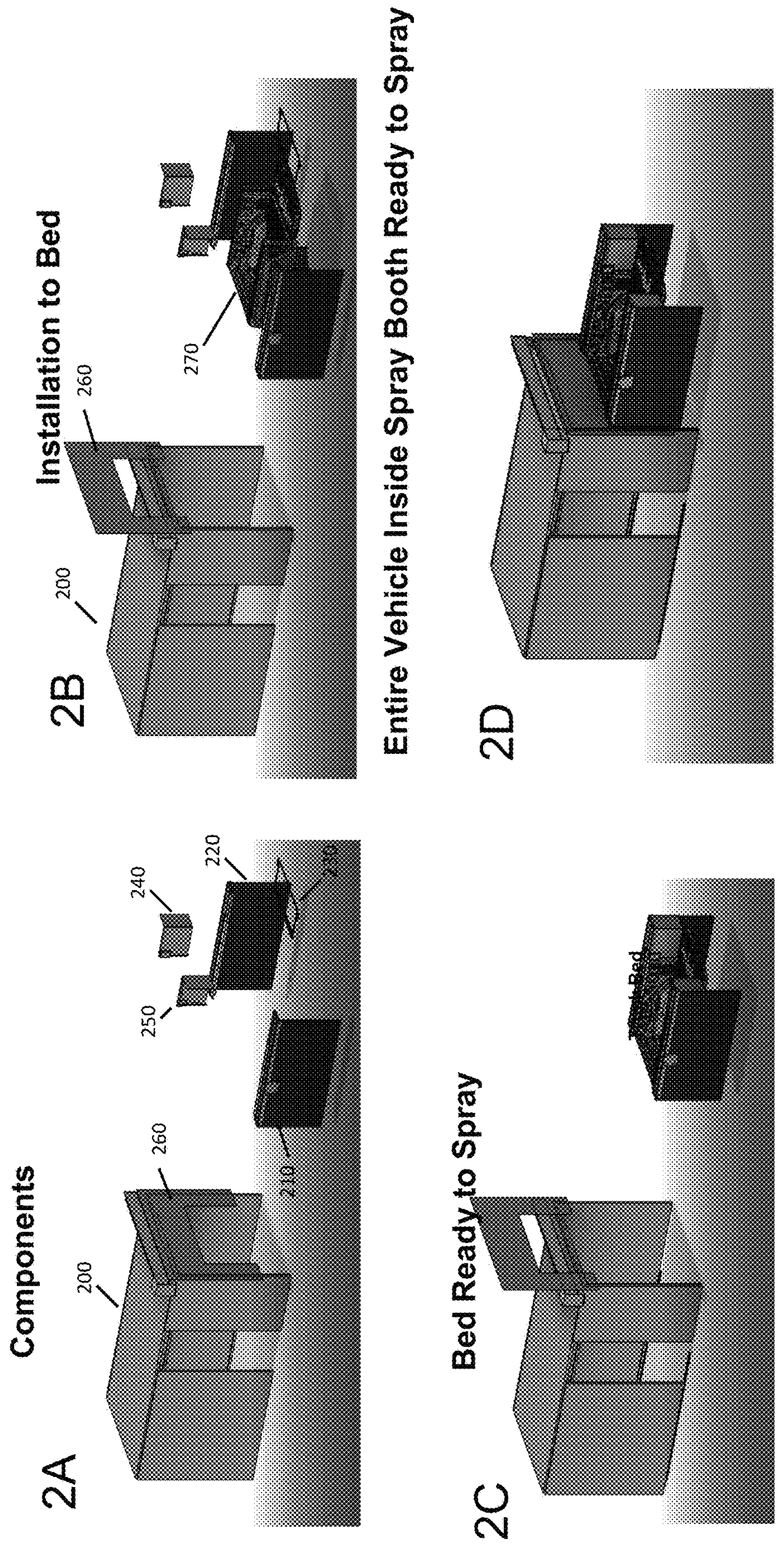
FIG. 2A-2D demonstrate components of the reusable masking aid system of the present invention.

FIG. 2A-2D provides an overview of the system of masking aids according to one aspect of the invention. Referring now to FIG. 2A, the system of masking aids may include a cab structure, 200. In FIG. 2A, the cab structure door is closed and in FIG. 2B, the cab structure door 260 is open to permit entry of vehicle cab (vehicle cab not shown). Again referring to FIG. 2A, the system of masking aids may also include two fender side protectors 210 and 220, a coated tailgate bridge 230 and coated D-Pillars 240 and 250. In the exploded view of FIG. 2B, application of the system of masking aids to a truck bed 270 is shown. FIG. 2C represents truck bed with the masking system in place and FIG. 2D demonstrates view as cab of truck is driven into the cab structure 210 and cab structure door 260 in closed. Vehicle is then ready for spray-on bed-liner application.

Figure 3A:
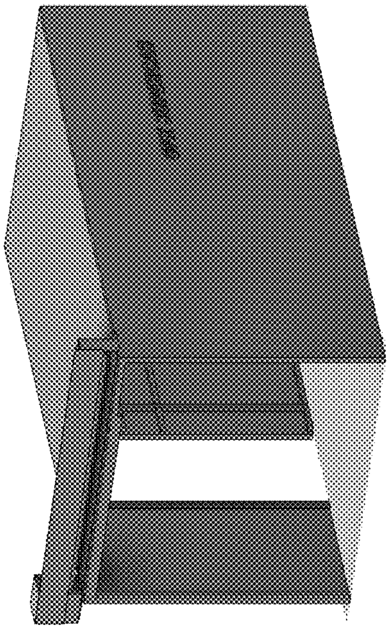
FIG. 3A-3C demonstrates different views of the cab structure component of the masking aid system of the present invention.
Figure 3B:
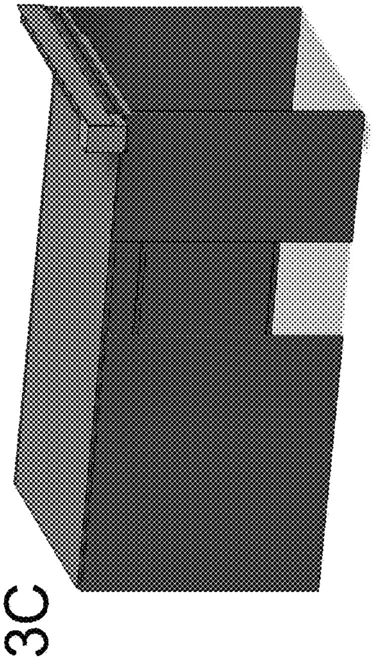
Figure 3C:
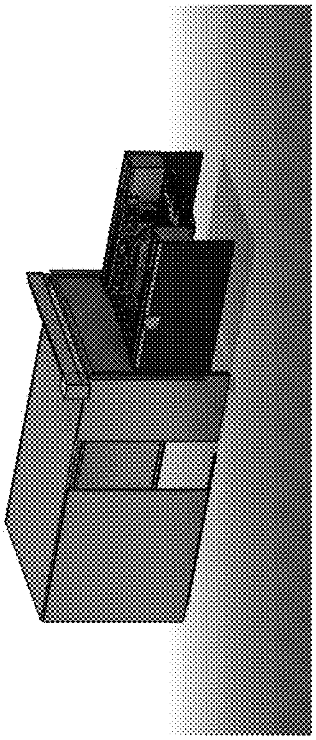

Referring now to FIG. 3A-3C, the cab structure of the system of masking aids is described in greater detail. Generally, the cab structure may be permanently placed inside an existing bedliner spray booth. A vehicle is driven or conveyed into the both so that the bed of the vehicle matches up with previously installed components of the masking system to prevent any overspray on surfaces not meant for spray-on bed-liner. See also FIG. 5B.

Figure 4:
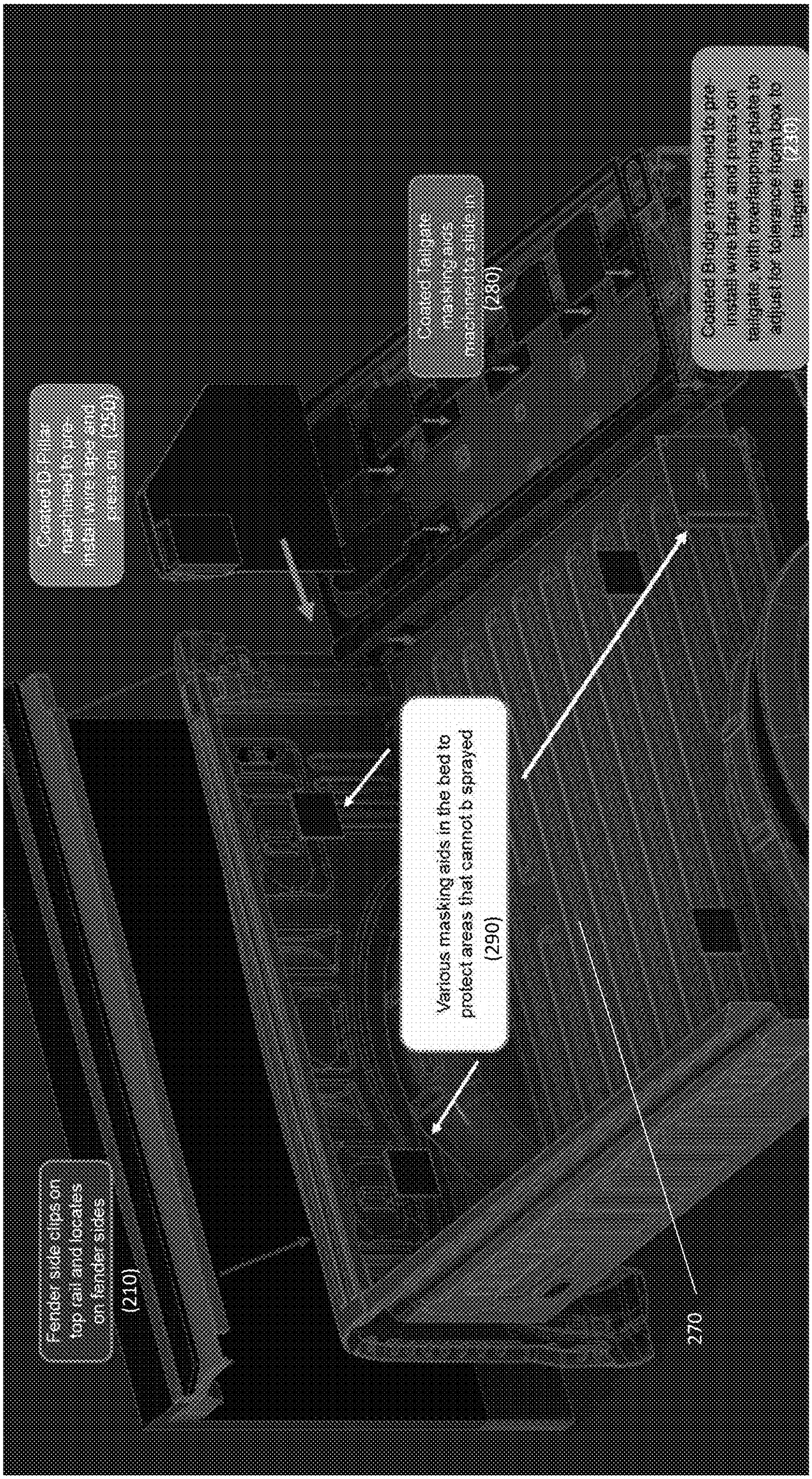
FIG. 4 demonstrates an exploded view of the reusable masking aid system of the present invention.

Referring now to FIG. 4, the bed of a vehicle to be sprayed with a spray-on bed-liner is shown in greater detail. A vehicle bed, 270 is shown. The fender side wall protectors 210 (220 not shown in FIG. 4), coated tailgate bridge, 230 and coated D-Pillars 250 (240 not shown in FIG. 4) are in place on the vehicle bed. Further, tailgate masking aids 280 and sidewall masking aids 290 are shown. Sidewall masking aids are also shown in FIG. 5C.

Figure 5A:
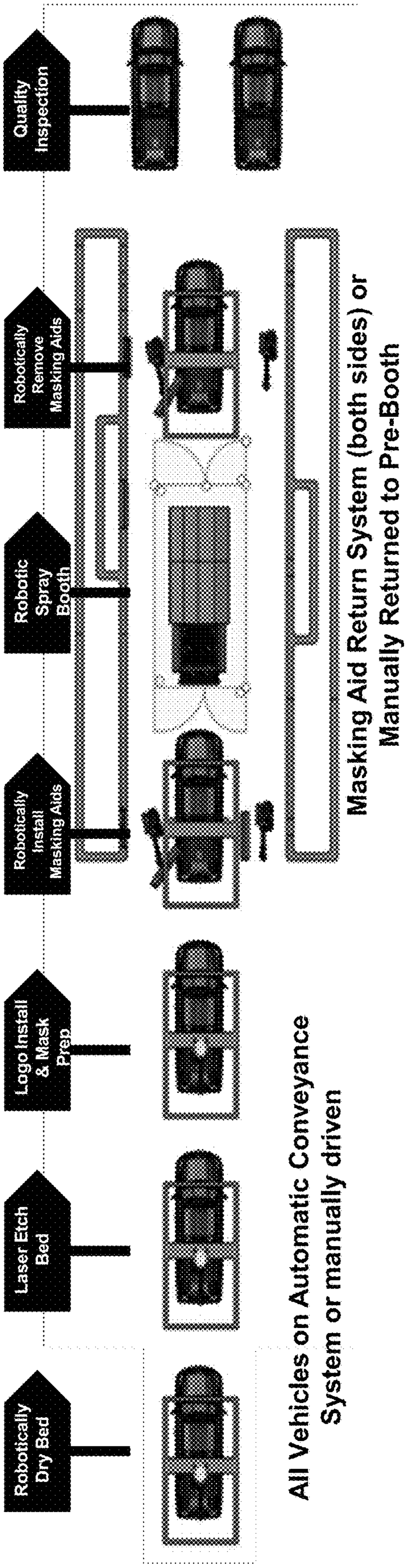
FIG. 5A-5C demonstrates a new process of applying a bedliner to a pickup truck with use of the reusable masking aid system of the present invention and automation.
Figure 5C:
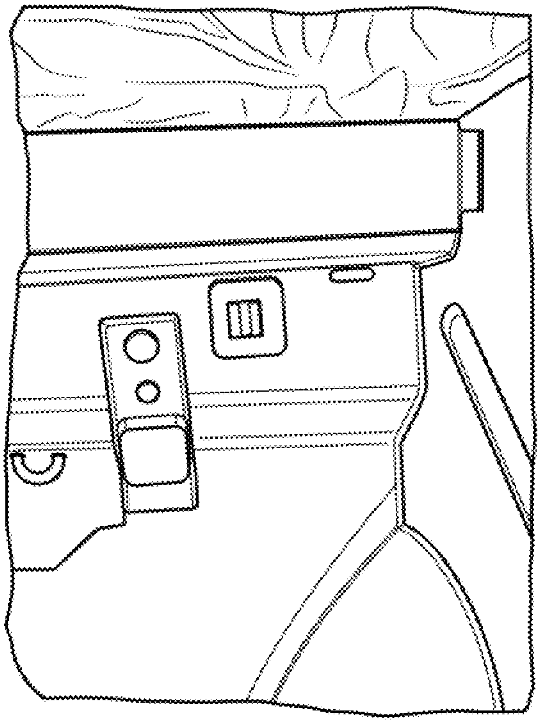
Figure 5B:
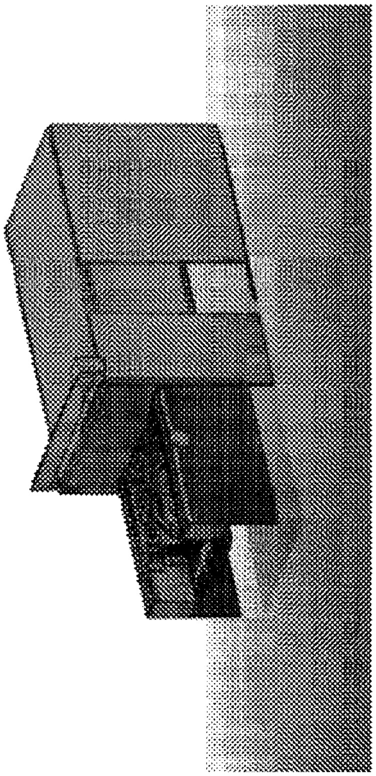

Referring now to FIG. 5A, it can now be seen how the addition of a system of masking aids lends the process of application of a spray-on bed-liner to automation of the process. In FIG. 5A, all vehicles may be placed on an automatic conveyance system or manually driven into a location for the optional steps of drying the truck bed, laser etching the vehicle bed, installing a logo, followed by installing of masking aids system either robotically or manually, the system including at least one of: fender side protectors, sidewall masking aids, a coated tailgate bridge, a tailgate masking aid, a coated D-Pillar. The process continues by driving or conveying vehicle into a cab structure and closing a cab structure door, applying a spray-on bed-liner, removing masking aids either robotically or manually, and visual quality inspection of the vehicle.

Certain embodiments have been described in the form of examples. It is impossible to depict every potential application. Thus, while the embodiments are described in considerable detail, it is not the intention to restrict or in any way limit the scope of the appended claims to such detail, or to any particular embodiment.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When "only A or B but not both" is intended, then the term "only A or B but not both" will be employed. Thus, use of the term "or" herein is the inclusive, and not the exclusive use. As used in the specification and the claims, the singular forms “a,” “an,” and “the” include the plural. Finally, where the term “about” is used in conjunction with a number, it is intended to include ±10% of the number. For example, “about 10” may mean from 9 to 11.

As stated above, while the present application has been illustrated by the description of embodiments, and while the embodiments have been described in considerable detail, it is not the intention to restrict or in any way limit the scope of the appended claims to such detail. Additional advantages and modifications will readily appear to those skilled in the art, having the benefit of this application. Therefore, the application, in its broader aspects, is not limited to the specific details and illustrative examples shown. Departures may be made from such details and examples without departing from the spirit or scope of the general inventive concept.

The invention claimed is:

1. A method for application of a spray-on bed-liner to a portion of first and second vehicles, the method comprising:
- providing a system of reusable masking aids, wherein the system of reusable masking aids comprises a reusable tailgate masking aid and a reusable pillar masking aid;
- positioning the reusable tailgate masking aid on top of a first open tailgate coupled to a first pickup box of the first vehicle;
- supporting the reusable pillar masking aid on the reusable tailgate masking aid and covering a first vertical end portion of the first pickup box with the reusable pillar masking aid;
- applying a spray-on bed-liner to a portion of the first vehicle;
- removing the reusable masking aids from the first vehicle;
- positioning the reusable tailgate masking aid on top of a second open tailgate coupled to a second pickup box of the second vehicle;
- supporting the reusable pillar masking aid on the reusable tailgate masking aid and covering a second vertical end portion of the second pickup box with the reusable pillar masking aid;
- applying the spray-on bed-liner to a portion of the second vehicle; and
- removing the reusable masking aids from the second vehicle.

2. The method for application of a spray-on bed-liner according to claim 1, wherein prior to securing the reusable masking aids to the first and second vehicles, the portion of the first and second vehicles to which the bed-liner is to be applied is laser etched.

3. The method for application of a spray-on bed-liner of claim 1, further comprising performing a quality control inspection of the first and second vehicles once the reusable masking aids are removed from the first and second vehicles.

4. The method for application of a spray-on bed-liner of claim 1, wherein, prior to securing the reusable masking aids to the first and second vehicles; the portion of the first and second vehicles to which the bed-liner is to be applied is cleaned, dried, and/or etched.

5. The method for application of a spray-on bed-liner of claim 1, wherein the system of reusable masking aids further comprises at least one sidewall masking aid, and further comprising applying the at least one sidewall masking aid over a protected area of the first and second vehicles.

6. The method for application of a spray-on bed-liner according to claim 1, wherein at least one of the reusable masking aids comprises a coating that resists application of the bed-liner to the at least one reusable masking aid.

7. The method for application of a spray-on bed-liner of claim 1, wherein the process is partially or fully automated.

8. The method for application of a spray-on bed-liner of claim 1, wherein the system of masking aids is specific for a vehicle make and model.

9. The method for application of a spray-on bed-liner of claim 1, wherein the first and second vehicles are pick-up trucks.

10. The method for application of a spray-on bed liner of claim 1 wherein the reusable tailgate masking aid comprises a ring structure covering a perimeter of the first and second open tailgates, wherein the ring structure defines an opening, and wherein applying the spray-on bend liner to the portion of the first and second vehicles comprises applying the spray-on bed-liner to a portion of the first and second open tail gates exposed in the opening.

11. The method for application of a spray-on bed liner of claim 1 wherein securing the reusable masking aid to the first and second vehicles comprises applying a fender side protector to a top rail of each of the first and second pickup boxes and covering an exterior side surface of each of the first and second pickup boxes with the fender side protector.

12. The method for application of a spray-on bed liner of claim 11 further comprising abutting the reusable pillar masking aid against the fender side protector.

13. The method for application of a spray-on bed liner of claim 11 wherein applying the fender side protector to the top rail of each of the first and second pickup boxes comprises clipping the fender side protector to the top rail of each of the first and second pickup boxes.

14. The method of claim 1 further comprising positioning a reusable tailgate bridge to cover a gap between the first pickup box and the first open tailgate coupled to the first pickup box.

15. A method for application of a spray-on bed-liner to a portion of a vehicle, the method comprising:
- providing a system of reusable masking aids;
- securing the reusable masking aids to a vehicle;
- lowering a door to isolate a cab of the vehicle from the portion of the vehicle to which the bed-liner is to be applied;
- applying a spray-on bed-liner to the portion of the vehicle; and
- removing the reusable masking aids from the vehicle.

16. The method for application of a spray-on bed-liner of claim 15 further comprising driving the vehicle partially into a cab structure prior to lowering the door to isolate the cab of the vehicle.

17. A method for application of a spray-on bed-liner to a portion of first and second vehicles, the method comprising:
- covering a first top rail of a first pickup box with a reusable fender side protector;
- positioning a reusable tailgate masking aid on top of a first open tailgate coupled to the first pickup box;
- supporting a reusable pillar masking aid on the reusable tailgate masking aid;
- abutting the pillar masking aid against the reusable fender side protector;
- applying a spray-on bed-liner to a portion of the first vehicle;
- preventing application of the spray-on bed-liner to the first top rail with the reusable fender side protector;
- removing the reusable fender side protector and exposing the first top rail of the first pickup box; and
- covering a second top rail of a second pickup box with the reusable fender side protector.

18. The method for application of a spray-on bed-line of claim 17 further comprising covering an exterior side surface of the first pickup box with the reusable fender side protector.

19. The method of claim 17 further comprising positioning a reusable tailgate bridge to cover a gap between the first pickup box and a first open tailgate coupled to the first pickup box.

20. A method for application of a spray-on bed-liner to a portion of a vehicle, the method comprising:

covering a first top rail of a first pickup box with a reusable fender side protector;

applying a spray-on bed-liner to a portion of the vehicle;

preventing application of the spray-on bed-liner to the top rail with the reusable fender side protector;

removing the reusable fender side protector and exposing the first top rail of the first pickup box;

covering a second top rail of a second pickup box with the reusable fender side protector; and lowering a door to isolate the first pickup box from a cab connected to the first pickup box.

21. The method for application of a spray-on bed-liner of claim 20 further comprising driving the cab into a cab structure prior to lowering the door to isolate the first pickup box from the cab.

* * * * *